United States Patent
Khushu et al.

(10) Patent No.: US 7,136,659 B2
(45) Date of Patent: Nov. 14, 2006

(54) UPDATE OF BASE STATION IDENTIFIERS BASED ON OVERHEAD VISIT

(75) Inventors: Sanjeev Khushu, San Diego, CA (US); Baaziz Achour, San Diego, CA (US); Christopher Patrick, San Diego, CA (US); Carol Yetter, Encinitas, CA (US)

(73) Assignee: Qualcomm, Incorporated, San Diego, CA (US)

( * ) Notice: Subject to any disclaimer, the term of this patent is extended or adjusted under 35 U.S.C. 154(b) by 95 days.

(21) Appl. No.: 10/392,020

(22) Filed: Mar. 18, 2003

(65) Prior Publication Data

US 2004/0048597 A1 Mar. 11, 2004

Related U.S. Application Data

(60) Provisional application No. 60/365,965, filed on Mar. 19, 2002.

(51) Int. Cl.
*H04Q 7/20* (2006.01)
(52) U.S. Cl. ................ 455/456.1; 455/456.3; 455/456.6
(58) Field of Classification Search ................ 370/335, 370/342; 455/456.1, 456.3, 456.5, 456.6, 455/421, 435.1
See application file for complete search history.

(56) References Cited

U.S. PATENT DOCUMENTS

| | | | | |
|---|---|---|---|---|
| 5,561,840 A | * | 10/1996 | Alvesalo et al. | 455/433 |
| 5,570,412 A | * | 10/1996 | LeBlanc | 455/456.2 |
| 5,713,073 A | * | 1/1998 | Warsta | 455/524 |
| 6,044,265 A | * | 3/2000 | Roach, Jr. | 455/419 |
| 6,259,923 B1 | * | 7/2001 | Lim et al. | 455/456.2 |
| 6,308,061 B1 | * | 10/2001 | Criss et al. | 455/418 |
| 6,363,255 B1 | * | 3/2002 | Kuwahara | 455/456.5 |
| 6,684,078 B1 | * | 1/2004 | Park | 342/357.09 |
| 6,728,539 B1 | * | 4/2004 | Kuwahara | 455/435.1 |
| 6,775,551 B1 | * | 8/2004 | Link, II | 455/456.1 |
| 6,861,980 B1 | * | 3/2005 | Rowitch et al. | 342/357.06 |
| 6,957,076 B1 | * | 10/2005 | Hunzinger | 455/456.3 |

FOREIGN PATENT DOCUMENTS

| EP | 1014103 | 6/2000 |
|---|---|---|
| WO | 9858505 | 12/1998 |

* cited by examiner

*Primary Examiner*—Doris H. To
*Assistant Examiner*—Steven Blount
(74) *Attorney, Agent, or Firm*—Philip Wadsworth; Bruce W. Greenhau; Andrea L. Mays (57) ABSTRACT

A visit to an overhead channel to obtain base station identifiers is made if it is necessary to do so. Base station identifiers are indicative of an approximate location of a terminal. The determination to update the base station identifiers may be made by monitoring one or more base stations in the terminal's active set. In another aspect, the terminal can originate a new data call immediately after the necessary base station identifiers have been obtained from the overhead channel, without having to wait for the expiration of a timer (e.g., the dormant timer). Moreover, by maintaining the data session when terminating the data call for the overhead visit, data communication may be more quickly resumed, for a new data call originated after the overhead visit, using the same configured protocols.

23 Claims, 4 Drawing Sheets

UPDATE OF BASE STATION IDENTIFIERS BASED ON OVERHEAD VISIT

The present application claims the benefit of U.S. Provisional Application No. 60/365,965, filed on Mar. 19, 2002.

BACKGROUND

1. Field

The present invention relates generally to data communication. More specifically, the present invention relates to techniques for selectively updating base station identifiers that may be used for position determination purposes.

2. Background

It is often desirable, and sometimes necessary, to know the position of a wireless user. For example, the Federal Communications Commission (FCC) has adopted a report and order for enhanced 911 (E-911) wireless service that requires the location of a wireless terminal (e.g., a cellular phone) to be provided to a Public Safety Answering Point (PSAP) each time a 911 call is made from the terminal. In addition to the FCC mandate, service providers have begun to recognize that location services (i.e., services that identify the position of a wireless terminal) may be used in various applications to provide value-added features. For example, a service provider may use location services to implement location-sensitive billing, provide location-sensitive information (e.g., driving directions, traffic report, nearest gas stations, and so on), and provide location-related services (e.g., asset tracking, asset monitoring and recovery, fleet and resource management, and so on).

The position of a wireless terminal may be determined based on (1) distances to a sufficient number of transmitters, which are used as reference points, and (2) the locations of these transmitters. The transmitters may be satellites of the well-known Global Positioning System (GPS), base stations of a wireless communication network, or a combination of both. The terminal can estimate the distance to each transmitter by measuring the time required for a signal to travel from the transmitter to the terminal. The location of the transmitters may be provided within the signals themselves or from another entity in the network. A position estimate may then be computed for the terminal based on the estimated distances to the transmitters and their locations.

A position determination entity (PDE) within the wireless communication network may provide some of the information needed to compute a position estimate for the terminal. This "aiding information" may include the location of the base stations, timing information, and so on. Depending on the whereabouts of the terminal within the network, the PDE may provide different information. For example, depending on the specific cell in which the terminal is currently located, the PDE may provide only the locations of base stations that may be received by terminals within that cell.

A large communication network may be composed of multiple systems, each of which may include a number of base stations. "Base station identifiers" may uniquely identify each base station in the network. Base station identifiers can comprise a base station identifier (Base ID), a system identifier (SID), and a network identifier (NID). For some networks, the base station identifiers (Base ID/SID/NID) may be transmitted via messages on an overhead channel. For example, in IS-95 and cdma2000 code division multiple access (CDMA) networks, the base station identifiers are transmitted via system parameter messages on a paging channel. For these networks the terminal is able to obtain the base station identifiers by processing the overhead channels.

The terminal can report the base station identifiers can to the PDE. The PDE can use the identifiers to determine the approximate location of the terminal.

A terminal is typically on a traffic channel during active communication with the wireless communication network. For IS-95 and cdma2000 networks, there are no defined messages that may be transmitted on the traffic channel that can update all of the base station identifiers (Base ID/SID/NID). If the terminal is in active communication with the network for a length of time and has moved some distance to a new location, then the base station identifiers obtained by the terminal at the start of the data communication may be incorrect. If these out-of-date base station identifiers are reported to the PDE, then the PDE may provide incorrect aiding information to the terminal.

There is therefore a need in the art for techniques for updating base station identifiers for position determination purposes.

SUMMARY

Techniques are described herein to provide up-to-date "identification" information for a wireless terminal while reducing overhead time. The identification information may comprise any information that may be used to determine an approximate location of the terminal (e.g., the cell in which the terminal is located). For IS-95 and cdma2000 networks, the identification information may comprise the base station identifiers (Base ID/SID/NID).

In an aspect, a visit to the overhead channel to obtain the base station identifiers is made if it is necessary to do so. This reduces the number of overhead visits, which can greatly improve performance. In another aspect, the terminal can originate a new data call immediately after the necessary base station identifiers have been obtained from the overhead channel, without having to wait for the expiration of a timer (e.g., the dormant timer).

In a specific embodiment, a method is described herein for providing up-to-date identification information (e.g., base station identifiers) for a terminal in a wireless (e.g., CDMA) communication network. In accordance with the method, an indication that the base station identifiers for the terminal are needed is first received. This indication may be received at the start of each new position determination session. A determination is then made whether or not the base station identifiers currently available for the terminal, if any, are up-to-date. This may be achieved, for example, by selecting a base station in the terminal's active set at the start of a data call and determining whether or not this base station has been dropped from the active set when the base station identifiers are needed.

If the currently available base station identifiers are not up-to-date, then up-to-date base station identifiers for the terminal are obtained from the overhead channel. This may be achieved by terminating the existing data call, processing the overhead channel to obtain up-to-date base station identifiers, and originating a new data call. To shorten overhead time, the new data call may be originated without waiting for the expiration of a timer (e.g., the dormant timer defined in IS-95 and cdma2000). In addition, by maintaining the data session (e.g., by not terminating the point-to-point protocol (PPP) connection) when terminating the data call for the overhead visit, data communication may be more quickly resumed for the new data call using the same configured protocols. The up-to-date base station identifiers are then provided (e.g., via IS-801 messages) on the traffic channel to the network.

Various aspects and embodiments of the invention are described in further detail below. The invention further provides methods, program codes, digital signal processors, receiver units, terminals, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
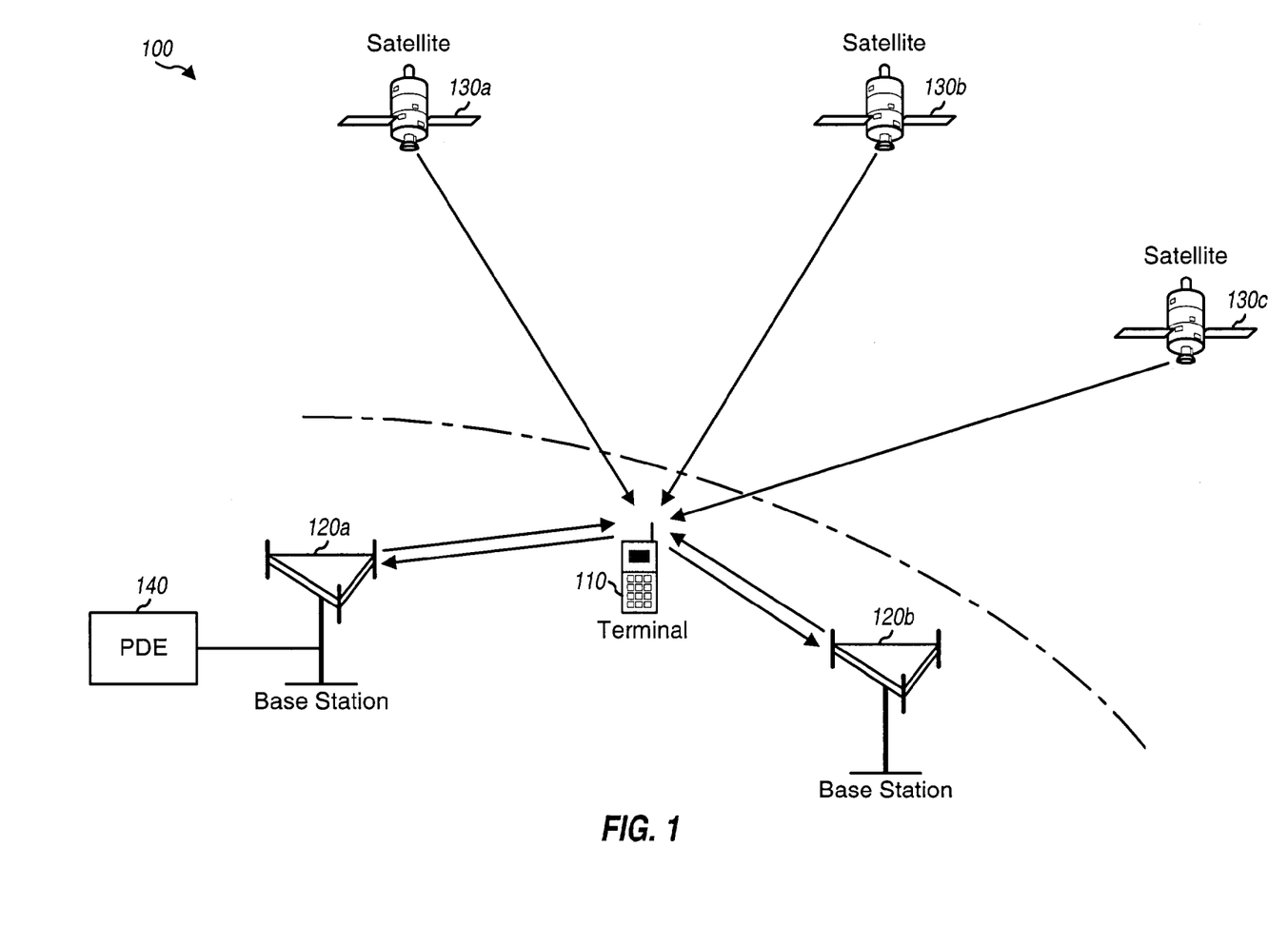
FIG. 1 is diagram of a hybrid position determination system that includes a number of position determination sub-systems.

FIG. 1 is diagram of a hybrid position determination system 100 that includes a number of position determination sub-systems. One such position determination sub-system is the well-known Global Positioning System (GPS). Another such position determination sub-system is a wireless (e.g., cellular) communication network, which may be a Code Division Multiple Access (CDMA) communication network or some other networks. The CDMA network may implement one or more CDMA standards such as IS-95, cdma2000, IS-856, W-CDMA, and so on. In a specific embodiment, hybrid position determination system 100 includes the Global Positioning System and a CDMA network that implements IS-95 and/or cdma2000.

In FIG. 1, a wireless terminal 110 receives signals transmitted from a number of transmitters, which may be base stations 120a and 120b of the CDMA network and/or satellites 130a, 130b, and 130c of the Global Positioning System. In general, any type of transmitters having locations that are known or can be ascertained may be used to determine the terminal's position.

Terminal 110 may be any device capable of receiving and processing signals from the transmitters in the position determination sub-systems to obtain timing, ranging, and/or location information. In one embodiment, terminal 110 is a cellular telephone capable of receiving signals from a number of transmitters. In other embodiments, terminal 110 may be an electronics unit (e.g., a computer terminal, a personal digital assistant (PDA), and so on) having a wireless modem, a receiver unit capable of receiving signals from satellites and/or base stations, or any other type of receiver.

The position of terminal 110 may be determined based on (1) distances to a sufficient number of transmitters, and (2) the locations of these transmitters. The terminal can estimate the distance to each transmitter by measuring the time required for a signal to travel from the transmitter to the terminal. If the time the signal is transmitted from the transmitter is known (e.g., stamped or encoded in the signal), then the travel time of the signal can be determined by observing the time the signal is received at the terminal (based on the terminal's internal clock). Typically however, the amount of time between transmission and reception cannot be exactly determined because of offsets between the clocks at the transmitter and terminal. Thus, a "pseudo-range" is typically derived based on the difference between a reference time and the time that the signal is received. The pseudo-range represents the relative distance between the terminal and the transmitter from which the signal was received.

The locations of the GPS satellites may be ascertained by processing the signals transmitted by the satellites. Each satellite transmits "Almanac" information, which includes information regarding coarse locations of all satellites in the GPS constellation. Each satellite further transmits "Ephemeris" information, which includes a higher accuracy version of its own orbit, as tracked and reported by tracking stations on earth. The locations of the base stations may be made known (e.g., via messages) to the entity performing the position determination. For example, a position determination entity (PDE) 140 may provide a database of the locations of the base stations and/or satellites to the terminal. The base stations may transmit the location information for the satellites and/or base stations to the terminal via messages.

PDE 140 may provide various types of "aiding information" that may be used for position determination. PDE 140 may be a base station designated to provide this functionality or may be a separate entity in the CDMA network. The aiding information may include satellite locations, base station locations, timing information, and so on. The aiding information may be location-sensitive. For example, the PDE may provide aiding information for base stations that may be received by a terminal at particular location. To provide the proper aiding information to the terminal, the PDE may need the approximate location of the terminal. The approximate location may be given by a base station whose cell the terminal is currently located within.

Thus, for position determination purposes, "identification" information indicative of the approximate location of the terminal may need to be obtained and provided to the PDE. This may be achieved by uniquely identifying the terminal's serving base station or a base station in close proximity to the terminal. For IS-95 and cdma2000 networks, each base station in the network may be uniquely identified by its base station identifiers, which include a base station identifier (Base ID), a system identifier (SID), and a network identifier (NID). For IS-95 and cdma2000 networks, the identification information may comprise the base station identifiers for the terminal's serving base station or a nearby base station. In general, the identification information may comprise any information that may be used to determine the approximate location of the terminal.

For IS-95 and cdma2000 networks, the complete base station identifiers are not available to the PDE directly from the infrastructure (i.e., the network). The terminal, however, can obtain the base station identifiers for the serving (or nearby) base station and provide this information to the network. The network can then forward the information to the PDE. Based on the base station identifiers from the terminal, the PDE can then estimate the terminal's current approximate location.

The terminal may be in the middle of a long data session on a traffic channel when the identification information is needed. In IS-95 and cdma2000 (Release 0) networks, there are no defined messages that may be transmitted on the traffic channel that include the complete base station identifiers (Base ID/SID/NID). In particular, for IS-95 and cdma2000, the (in-traffic) system parameter messages that may be transmitted on the traffic channel only include fields for the SID and NID, but not for the Base ID. Instead, the complete base station identifiers may be sent via messages on an overhead channel (e.g., a paging channel). For these networks, the terminal can obtain the base station identifiers from the overhead channel, either from an earlier visit to the overhead channel or by visiting the overhead channel when the information is needed (e.g., at the beginning of a position determination session).

A terminal can obtain up-to-date base station identifiers by exiting the traffic channel and visiting the overhead channel to collect this information. In one conventional implementation, the visit to the overhead channel is achieved via a dormancy function specified by IS-95 and cdma2000 standards. For this implementation, at the start of each and every position determination session (i.e., each time the base station identifiers are needed), the terminal terminates the current data call and leaves the traffic channel. The terminal then goes to the overhead channel (e.g., the paging channel) and obtains the base station identifiers (Base ID/SID/NID) by processing the overhead messages sent on this channel. For IS-95 and cdma2000, the overhead messages that include the complete base station identifiers are the system parameter messages.

As part of the dormancy function, the terminal maintains a dormant timer that is reset upon terminating the data call. In accordance with the IS-95 and cdma2000 standards, the terminal needs to wait for the dormant timer to expire before it can originate a new data call to resume data communication. The dormant timer is used to prevent the terminal from quickly terminating and originating calls. The service provider may specify the duration of the dormant timer. For example, the duration can be set at five seconds for one cdma2000 network currently deployed.

By requiring a visit to the overhead channel at the start of each and every position determination session, the conventional implementation described above can ensure that the terminal will have up-to-date base station identifiers (Base ID/SID/NID). However, using the dormancy function and the dormant timer described above, a delay of over 5 seconds (or more specifically, 5 seconds for the dormant timer+call termination+call origination) is encountered for each position fix. This delay is undesirable and may even be unacceptable for certain applications.

Techniques are described herein to provide up-to-date identification information (e.g., base station identifiers) for a terminal while reducing overhead time. In an aspect, a visit to the overhead channel to obtain base station identifiers is made if it is necessary to do so (and not for each and every position determination session). This reduces the number of overhead visits, which can greatly improve performance. In another aspect, the terminal can originate a new data call immediately after the necessary base station identifiers have been obtained from the overhead channel, without having to wait for the expiration of a timer (e.g., the dormant timer). As used herein, a "quick overhead visit" is a process of terminating an existing data call for a visit to the overhead channel and then originating a new data call after the necessary information has been obtained, without having to wait for the expiration of the dormant timer. The quick overhead visit reduces the amount of time away from the traffic channel, if and when the base station identifiers need to be updated. These aspects are described in further detail below.

Figure 2:
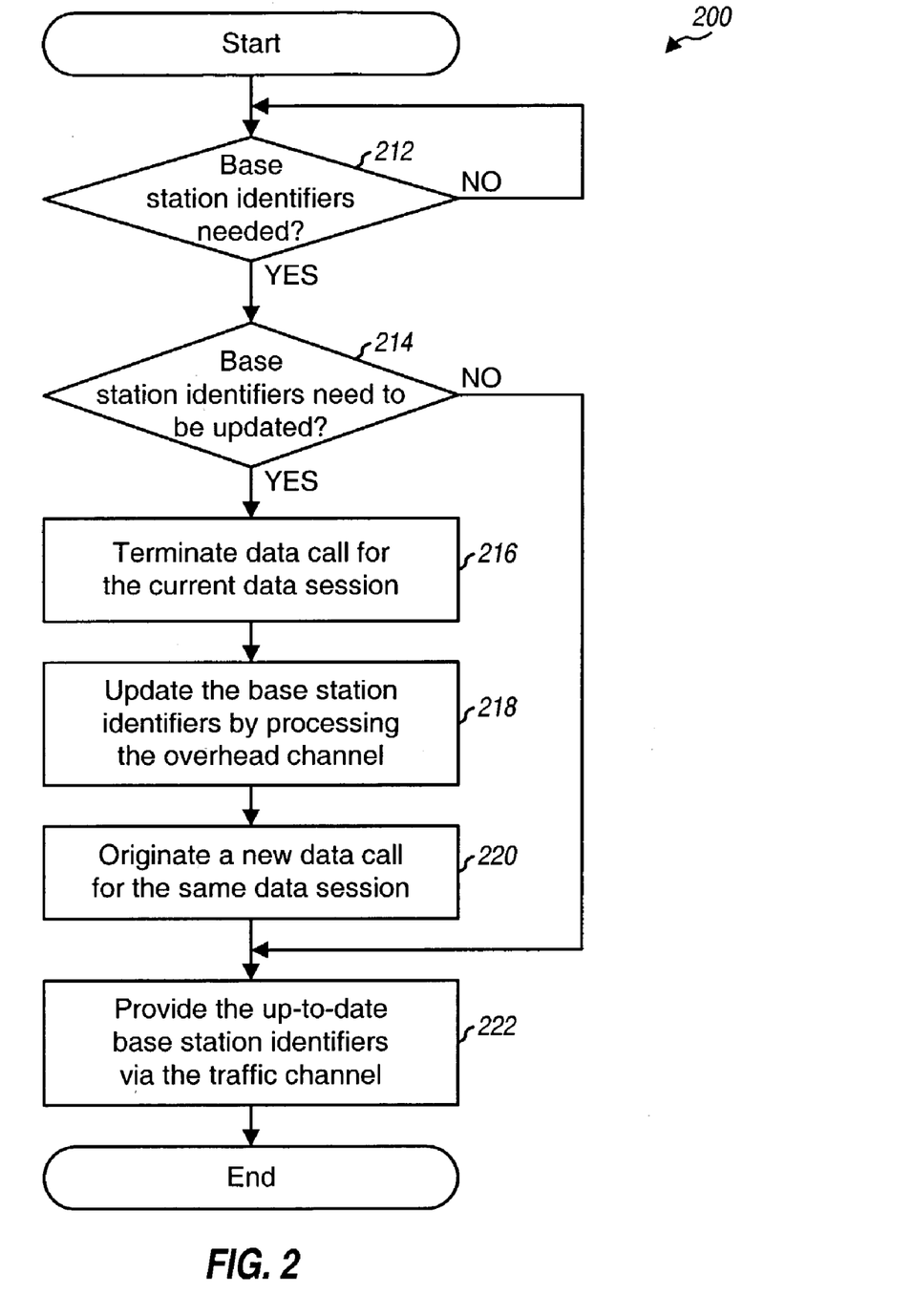
FIG. 2 is a flow diagram of an embodiment of a process performed at a terminal to provide up-to-date base station identifiers.

FIG. 2 is a flow diagram of an embodiment of a process 200 performed at a terminal to provide up-to-date base station identifiers. Initially, a determination is made whether or not the base station identifiers are needed (step 212). The base station identifiers may be needed whenever the terminal's approximate location is needed, which may be, for example, at the start of each new position determination session. If the base station identifiers are not needed, then the process returns to step 212. Otherwise, a determination is made whether the existing base station identifiers (i.e., the ones currently available for the terminal) are current or need to be updated (step 214). To reduce overhead time, the base station identifiers are updated only if necessary. A specific scheme for determining whether or not the base station identifiers need updating is described in further detail below. If the existing base station identifiers are up-to-date, then the process proceeds to step 222 and the terminal provides the base station identifiers.

If the existing base station identifiers are not up-to-date, then the terminal obtains up-to-date base station identifiers. The terminal can terminate the current data call (step 216). To maintain the current data session and the protocols that have been configured, the terminal does not terminate the PPP connection when exiting the current data call. This allows the terminal to quickly resume the same data session at a subsequent time upon being assigned a traffic channel for a new data call.

The terminal then processes the overhead channel and obtains the base station identifiers from the overhead messages transmitted on this channel (step 218). The terminal then originates a new data call to resume data communication (step 220). The call termination, overhead channel processing to obtain the base station identifiers, and call origination are all known in the art and not described in further detail herein.

Upon being assigned a traffic channel for the new data call, the terminal can resume the same data session since it was not terminated previously. By not terminating the PPP connection to obtain the base station identifiers, the protocols previously configured for the data session are maintained during the entire time away from the traffic channel. These protocols can be used again, as previously configured, upon returning to the traffic channel, which can reduce the amount of time needed to resume data communication.

Once the terminal regains access to the traffic channel, the up-to-date base station identifiers are sent by the terminal to the network (step 222). The up-to-date base station identifiers may be the existing base station identifiers, if it is determined in step 214 that no update of this information is needed. Alternatively, the up-to-date base station identifiers may be the new base station identifiers just obtained from the overhead channel. In an embodiment, the up-to-date base station identifiers are sent by the terminal to the network via IS-801 messages on the traffic channel. IS-801 messages are described in detail in TIA/EIA/IS-801, entitled "Position Determination Service Standard for Dual Mode Spread Spectrum Systems," Nov. 1, 1999, which is publicly available and incorporated herein by reference. The network may then forward the base station identifiers for the terminal to the PDE.

As shown in FIG. 2, the terminal can originate the new data call after the base station identifiers have been obtained from the overhead channel, without having to wait for a dormant timer to expire. The overhead time needed to collect the necessary information is call termination+overhead channel processing+call origination. Typically, the overhead channel may be processed in a time period much shorter than the length of the dormant timer. The overhead time needed to update the base station identifiers with the quick overhead visit would then be much shorter than the overhead time needed by the conventional implementation described above. The quick overhead visit may thus greatly shorten the time away from the traffic channel to update the base station identifiers, which is highly desirable.

The identification information, such as the base station identifiers, may be used to determine the approximate location of the terminal. This identification information may then be used by the PDE to provide the pertinent aiding information for position determination. The performance of the position determination may thus depend on the accuracy of the identification information.

As noted above, to reduce the overhead time needed to provide up-to-date base station identifiers, the terminal makes a visit to the overhead channel if the base station identifiers need to be updated. In many instances, the terminal may be in active communication with the same base station either (1) for the entire duration of a data communication or (2) for the entire time period since the last overhead visit. In either case, if the terminal continues to communicate with the same base station, then the existing base station identifiers for the terminal are up-to-date, and the terminal does not need to perform an overhead visit to update these parameters. In these instances, substantial saving in overhead time may be achieved by foregoing the overhead visit. In contrast, the conventional implementation described above performs an overhead visit at the start of each and every position determination session, even if the base station identifiers have not changed, just to ensure that up-to-date information is provided by the terminal. For this conventional implementation, many unnecessary overhead visits may be made, which impacts performance.

The decision on whether or not the base station identifiers need to be updated is made based on the status of one or more base stations in the terminal's active set. A terminal that has registered with the network and is in active communication is typically associated with an "active set" of one or more base stations with which the terminal communicates. The terminal may concurrently communicate with multiple base stations while in soft handoff (or soft handover) to provide diversity against deleterious path effects such as fading and multipath.

The active set is valid and used when the terminal is in active communication and assigned a traffic channel. One base station in the active set is typically designated as the "reference" base station, and various system parameters (e.g., timing) are referenced with respect to this base station. For example, the terminal may designate the base station with the strongest received signal as the reference base station, or the network may indicate which base station is the reference base station in a common or dedicated control message. The base stations in the active set may concurrently transmit user-specific traffic data and/or dedicated messages (e.g., pages) to the terminal to increase the reliability of the transmission.

Each base station provides communication for a particular coverage area. Depending on the network deployment, this coverage area may be a cell or a sector of a cell. For IS-95 and cdma2000 networks, each base station (which may provide coverage for either a cell or a sector) is assigned a specific offset (or phase) of a pseudo-random noise (PN) sequence. The PN sequence is used to spread data and pilot prior to transmission over the communication link. By assigning neighboring base stations with different PN offsets, the terminal is able to identify each base station in its active set (and other nearby base stations with which it may communicate) by the PN offset of the pilot from the base station.

In a practical implementation, one "physical" base station may provide coverage for all (e.g., three) sectors of a given cell. In this case, the specific physical base station that includes the reference base station is referred to as the "serving" base station. This serving base station may also provide coverage for other sectors. Each sector covered by the serving base station would then be assigned a different PN offset. The PN offset assigned to the reference base station is referred to as the reference PN offset, and the pilot from this base station is referred to as the reference pilot. However, for simplicity, the description herein assumes that each base station is assigned a different PN offset and provides communication for a respective coverage area, which may be either a cell or a sector.

Figure 3:
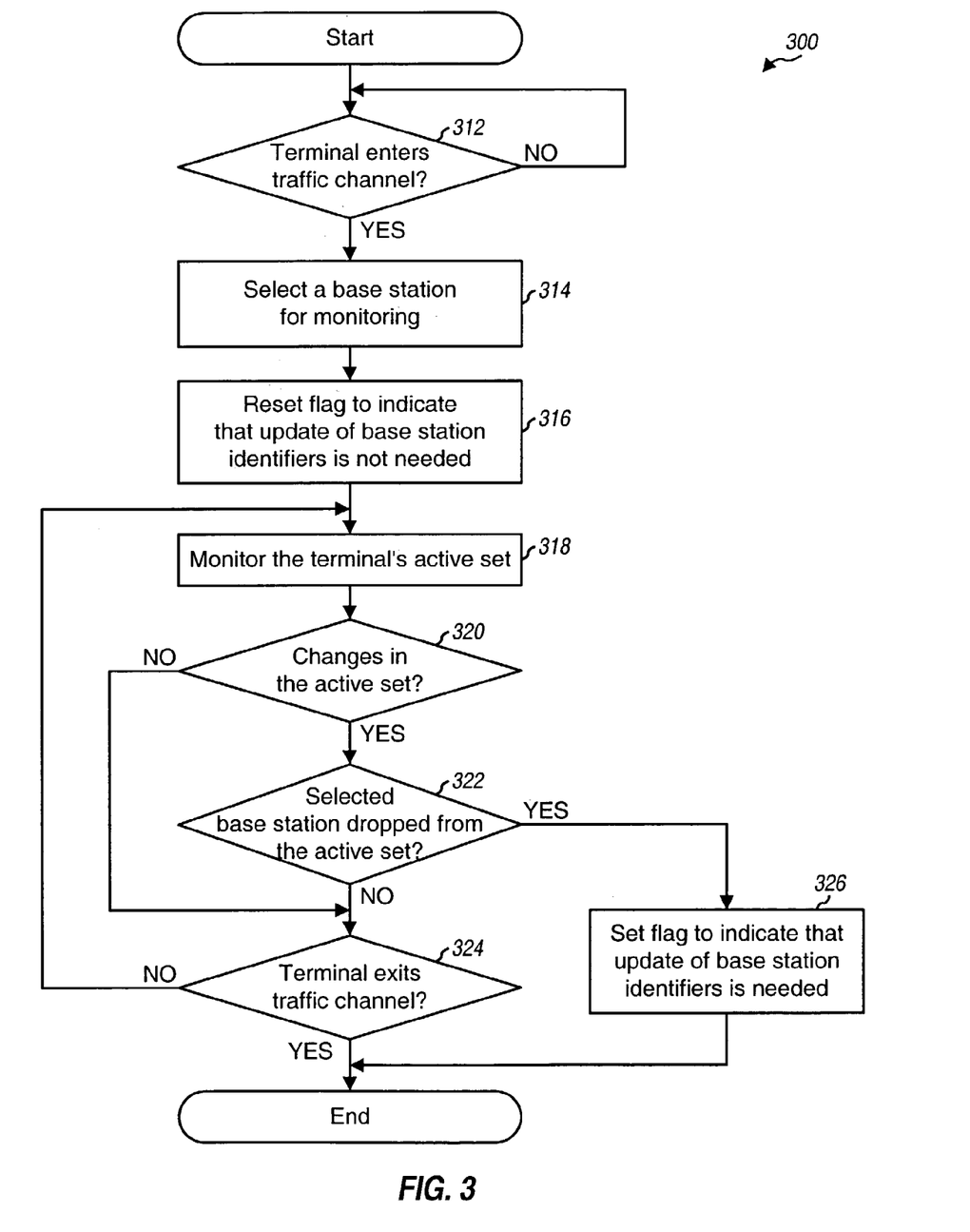
FIG. 3 is a flow diagram of an embodiment of a process for determining whether or not the base station identifiers need to be updated.

FIG. 3 is a flow diagram of an embodiment of a process 300 for determining whether or not the base station identifiers for a terminal need to be updated. Process 300 may be used for step 214 in FIG. 2. Process 300 is for a scheme whereby the decision for updating is based on the status of a single selected base station in the terminal's active set.

Initially, a determination is made whether or not the terminal has entered the traffic channel (step 312). This may occur when the terminal originates a data call at the start of a data session or when the terminal originates a new data call after an overhead visit. If the terminal has not entered the traffic channel, then the process returns to step 312. Otherwise, a base station is selected for monitoring (step 314). As noted above, for simplicity, each base station is assumed to be assigned a respective PN offset for its coverage area. (In a practical network, the base stations for multiple sectors of a given cell may be implemented by a single physical base station). In an embodiment, the selected base station is the reference base station, which may be a base station designated by the terminal (e.g., the base station with the strongest received signal strength) or one designated by the network (e.g., via messages). In an alternative embodiment, another base station in the terminal's active set is selected for monitoring. In general, any set of one or more base stations that may be used to ascertain the approximate location of the terminal for position determination purposes may be selected for monitoring.

In an embodiment, a flag is used to indicate whether or not the base station identifiers for the terminal need updating. This flag is initially reset to indicate that no updating is needed (step 316). Thereafter, while the terminal is on the traffic channel, its active set is monitored (step 318). The terminal's active set is continually updated as it moves in and out of coverage of different base stations in the network. For example, a mobile terminal may be handed from one base station to another base station as it moves about the network, and the active set is updated for each hand-off.

A determination is then made whether or not there have been any changes in the active set (step 320). The active set may change if any base station in the set is no longer received by the terminal (e.g., if the signal strength of the base station drops below a particular threshold). If the active set has not changed, then the process proceeds to step 324. Otherwise, if a change in the active set has been detected, then a determination is made whether or not the selected base station has been dropped from the active set (step 322). If the selected base station is still in the active set, then the process proceeds to step 324.

If the selected base station has been dropped from the active set, then this is used as an indication that the terminal has moved some distance from its prior location so that the existing base station identifiers may not be correct. In this case, the flag is set to indicate that the base station identifiers are to be updated, if and when they are needed (step 326). Upon setting the flag, the process terminates.

In step 324, which is reached if there are no changes in the active set or if the selected base station has not been dropped from the active set, a determination is made whether or not the terminal has exited the traffic channel. If the terminal is still on the traffic channel, then the process returns to step 318 and continues to monitor the active set. Otherwise, if the terminal has exited the traffic channel, then the process terminates.

As shown in FIG. 3, the flag is reset upon entering the traffic channel, and is set if and when the selected base station is dropped from the active set. At any given time while the terminal is on the traffic channel, a new position determination session may be started. If this occurs, then the status of the flag at that moment may be ascertained and used to determine the specific processing to be performed.

If the flag is reset, indicating that the terminal is still within the coverage of the selected base station, then the base station identifiers are not updated. In this case, the terminal may proceed with the position determination session without ending the data call. The terminal can start exchanging IS-801 messages with the PDE for the existing base station identifiers, which are still valid and up-to-date. An unnecessary overhead visit is then saved for this position determination session.

If the flag is set, indicating that the terminal has moved to a new location, then the base station identifiers are updated by performing a visit to the overhead channel. In this case, the terminal can terminate the current data call without terminating the PPP connection (i.e., without affecting the configured protocols), obtain up-to-date base station identifiers from the overhead channel, and thereafter originate a new data call for the same data session. Upon being assigned a traffic channel for the new data call, the terminal can exchange IS-801 messages with the PDE for the up-to-date base station identifiers.

The specific embodiment shown in FIG. 3 continually monitors the terminal's active set to determine whether or not the selected base station has been dropped, at which time the flag is set. Once the flag has been set, the terminal can stop monitoring the active set for the purpose of deciding whether or not update of the base station identifiers is needed.

In an alternative embodiment, the terminal only evaluates the active set if and when it receives an indication that the base station identifiers are needed. For this embodiment, the terminal selects a base station at the start of a data call, similar to that described above in FIG. 3. Thereafter, if the terminal receives an indication that the base station identifiers are needed, then it examines the active set to determine whether or not the selected base station is still in the active set. If the answer is yes, then the existing base station identifiers are deemed to be current and no overhead visit needs to be made. This embodiment can prevent an unnecessary overhead visit for situations in which the terminal leaves the coverage of the selected base station (which is then dropped from the active set) and thereafter returns to the same selected base station.

In the first scheme shown in FIG. 3, the updating of the base station identifiers is decided based on the status of a single selected base station. More specifically, the base station identifiers are updated if the selected base station has been dropped from the active set.

In a second scheme, the updating of the base station identifiers is decided based on changes to the entire active set. For this scheme, if all base stations in the active set at the start of the data call are dropped (i.e., no common base station in the active set at the start of the data call and the active set at the time the base station identifiers are needed), then an update is deemed to be needed.

In a third scheme, the updating of the base station identifiers is decided based on changes to any one base station in the active set. For this scheme, the base station identifiers are updated if the active set at the start of the data call is not the same as the active set at the time they are needed.

In a fourth scheme, the base station identifiers are periodically updated. This may be achieved based on a timer that is reset whenever the base station identifiers are obtained. At the expiration of this timer, the base station identifiers are automatically updated.

In a fifth scheme, the base station identifiers are updated if and whenever the terminal estimates that it has moved sufficiently far from its prior location. The amount of movement may be estimated, for example, based on a velocity estimate from a prior position fix and the amount of time that has elapsed since that position fix.

In a sixth scheme, the updating of the base station identifiers is decided based on "caching" at the terminal. The terminal may maintain a log of changes to the active set. Whenever the base station identifiers are needed, the terminal can attempt to retrace its steps based on the log. If the terminal cannot retrace its step, which may then indicate that the terminal has moved to a new location, then the base station identifiers are updated.

In a seventh scheme, the updating of the base station identifiers is decided based on the pilot strength of the base stations in the active set. The pilot strength may be used as a rough indication of the distance to the base station. If the pilot strength of one or more base stations in the active set has sufficiently changed, then the base station identifiers are updated.

Various other schemes for determining whether or not the terminal has moved sufficiently far from its prior location to require updating of the base station identifiers may also be implemented, and this is within the scope of the invention. In general, the decision on whether or not to update may be made based on various criteria such as changes in the status of one or more base stations in the active set, time, and so on. Any criteria may be used as long as they can indicate with some certainty that the terminal has moved sufficiently far so that the base station identifiers should be updated.

In accordance with the dormant mode defined by the IS-95 and cdma2000 (Release 0) standards, the terminal is not allowed to originate a new data call until the dormant timer has expired. If the quick overhead visit can be specified to fall outside the scope of the dormant mode, then the new data call may be originated without reference to the dormant timer. Performance may be greatly enhanced by not having to wait for the dormant timer to expire. The quick overhead visit may be implemented without affecting or modifying the operation of the dormant mode. Both the dormant timer and the inactivity timer may continue to operate in the normal manner for each pair of call termination and origination due to low activity on the data link. However, these timers are not used to control the functionality of the quick overhead visit.

However, the quick overhead visit may not be possible for various reasons such as, for example, system compatibility issues, adverse impact due to close spacing of the call termination/origination, and so on. In this case, the overhead visit may be implemented using the dormant timer, similar to the conventional implementation described above. Alternatively, a shorter timer may be used for the quick overhead visit. If a shorter timer can be used for the overhead visit, then the techniques described herein can still provide improved performance.

The techniques described herein may thus be used to reduce both the number of visits to the overhead channel to obtain up-to-date base station identifiers and (possibly) the duration of each overhead visit. These dual benefits may be achieved while still providing up-to-date and accurate base station identifiers, regardless of when the current data call was started and the distance the terminal has moved since the last update.

Figure 4:
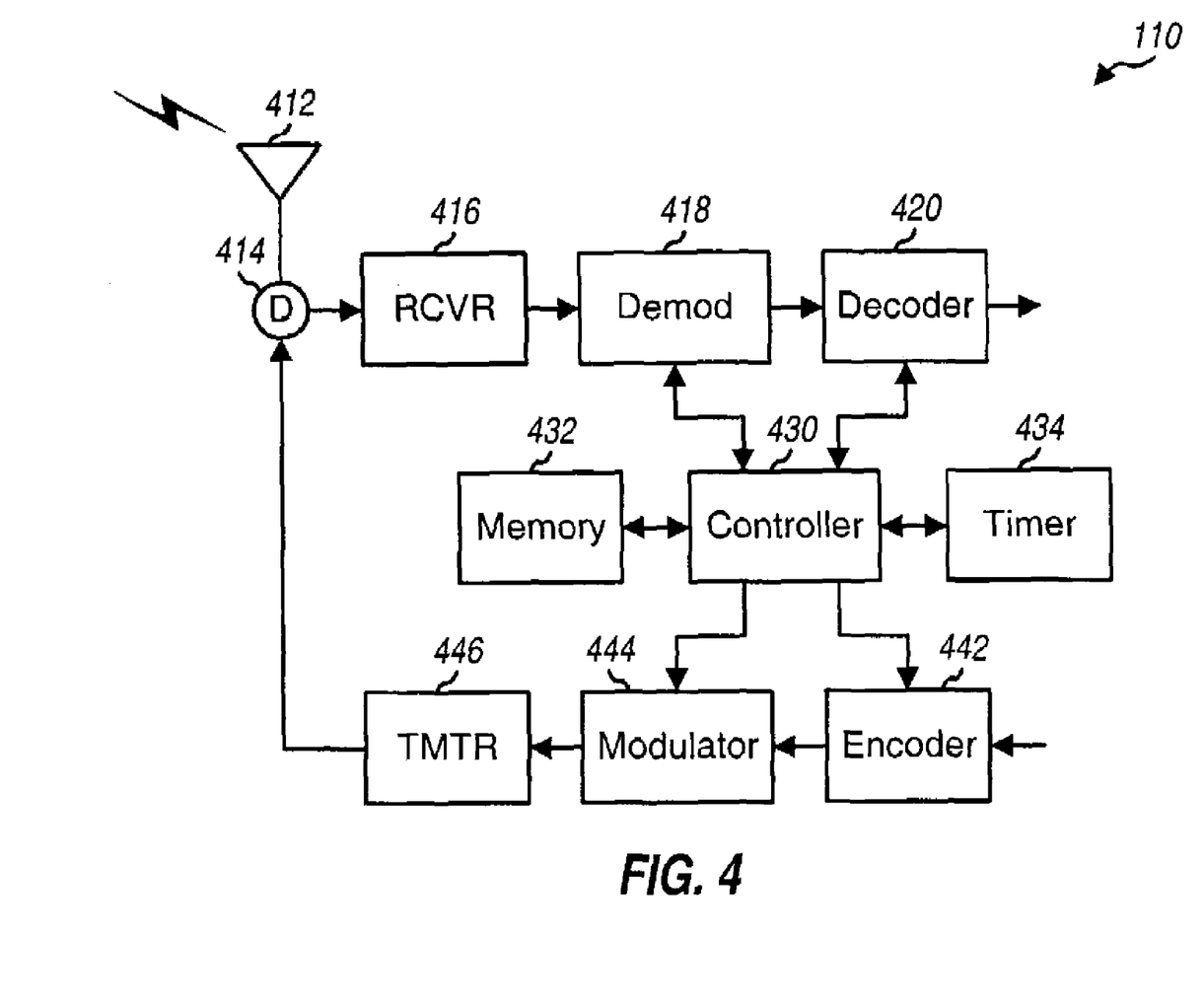
FIG. 4 is a block diagram of an embodiment of a terminal.

FIG. 4 is a block diagram of an embodiment of terminal 110, which is capable of providing up-to-date identification information indicative of its approximate location. At terminal 110, the modulated signals transmitted from one or more base stations are received by an antenna 412, and the received signal is routed through a duplexer (D) 414 and provided to a receiver (RCVR) 416. Receiver 416 conditions (e.g., amplifies, filters, and downconverts) the received signal and digitizes the conditioned signal to provide samples. A demodulator (Demod) 418 then demodulates the samples in accordance with a demodulation scheme that is complementary to the modulation scheme used at the base station for the channel being processed. A decoder 420 next decodes the demodulated data in accordance with a decoding scheme that is complementary to the encoding scheme used at base station for the channel being processed.

A controller 430 directs the operation of various elements within terminal 110. For example, controller 430 may direct demodulator 418 and/or decoder 420 to process the traffic channel for a data call. Controller 430 may also direct demodulator 418 and/or decoder 420 to process the overhead channel if the base station identifiers are needed but are not up-to-date.

For each overhead visit, demodulator 418 and/or decoder 420 process the overhead channel (e.g., the paging channel) to obtain the base station identifiers from messages (e.g., system parameter messages) transmitted on this channel. Demodulator 418 and/or decoder 420 then provides the pertinent identification information, such as the base station identifiers, to controller 430.

Controller 430 may implement the process shown in FIG. 3 to determine whether or not an update is needed and the process shown in FIG. 2 to provide up-to-date base station identifiers. Controller 430 may maintain the active set for the terminal and may update the active set based on information from demodulator 418 (e.g., signal strength indications).

For the reverse link, at terminal 110, the data to be transmitted on the reverse link is encoded by an encoder 442 in accordance with a particular encoding scheme, and further modulated by a modulator 444 in accordance with a particular modulation scheme. A transmitter (TMTR) 446 then converts the modulated data into one or more analog signals and further conditions the analog signals to provide a reverse link modulated signal, which is routed via duplexer 414 and transmitted from antenna 412 to the base stations.

Terminal 110 may also process signals from GPS satellites. However, the processing for GPS signals is not shown in FIG. 4 for simplicity.

Memory unit 432 stores data and program code needed by controller 430. For example, memory 432 may store the existing base station identifiers, information used for position determination, and so on. A timer 434 may provide timing control, and may implement the dormant timer, if needed.

For clarity, the techniques to provide up-to-date identification information indicative of the terminal's approximate location have been specifically described for IS-95 and cdma2000 networks. These techniques may also be used for other CDMA networks and possibly other wireless communication networks.

The techniques described herein for providing up-to-date identification information may be implemented by various means. For example, these techniques may be implemented in hardware, software, or a combination thereof. For a hardware implementation, the techniques described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory 432 in FIG. 4) and executed by a processor (e.g., controller 430). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for providing up-to-date identification information indicative of an approximate location and comprising base station identifiers that include a base station identifier (Base ID), a system identifier (SID), and a network identifier (NID) for a terminal in a wireless communication network, comprising:
   receiving a first indication that identification information for the terminal is needed;
   determining whether or not identification information currently available for the terminal, if any, is up-to-date without processing an overhead channel;
   obtaining up-to-date identification information for the terminal from the overhead channel if the currently available identification information is not up-to-date; and
   providing the up-to-date identification information via a traffic channel, and wherein the base station identifiers are provided via IS-801 messages over a wireless communication link.

2. The method of claim 1, wherein the first indication is received in response to a new position determination session.

3. The method of claim 1, wherein the determining whether or not identification information currently available for the terminal, if any, is up-to-date comprises:
   selecting a base station for monitoring, and
   providing a second indication that the identification information needs updating if communication is not maintained with the selected base station.

4. The method of claim 3, wherein the second indication is provided if the selected base station is dropped from an active set of the terminal.

5. The method of claim 3, wherein the selected base station is a reference base station.

6. The method of claim 1, wherein the determining whether or not identification information currently available for the terminal, if any, is up-to-date comprises:
identifying a list of one or more base stations with which the terminal is in communication, and
providing a second indication tat the identification information needs updating based on changes to the list of one or more base stations.

7. The method of claim 6, wherein the second indication is provided if all base stations in the list have been dropped from an active set of the terminal.

8. The method of claim 6, wherein the second indication is provided if any one base station in the list has been dropped from an active set of the terminal.

9. The method of claim 1, wherein the wireless communication network is a CDMA network.

10. The method of claim 1, wherein the wireless communication network is a cdma2000 CDMA network.

11. A method for providing up-to-date identification information indicative of an approximate location of a terminal in a wireless communication network, comprising:
receiving an indication that identification information for the terminal is needed;
determining whether or not identification information currently available for the terminal, if any, is up-to-date;
obtaining up-to-date identification information for the terminal from an overhead channel if the currently available identification information is not up-to-date, comprising
terminating an existing data call,
processing the overhead channel to obtain the up-to-date identification information, and
originating a new data call; and
providing the up-to-date identification information in IS-801 messages sent on a traffic channel over a wireless communication link.

12. The method of claim 11, wherein the new data call is originated without waiting for expiration of a timer.

13. The method of claim 11, wherein the obtaining up-to-date identification information for the terminal from an overhead channel if the currently available identification information is not up-to-date further comprises:
maintaining an existing data session in conjunction with the termination of the existing data call, and wherein the new data call is for the existing data session.

14. The method of claim 13, wherein the existing data session is maintained by maintaining a Point-to-Point Protocol (PPP) connection.

15. The method of claim 11, wherein the identification information comprises a base station identifier (Base ID), a system identifier (SID), and a network identifier (NID).

16. The method of claim 11, further comprising:
receiving aiding information used for position determination and provided by a network entity based on the up-to-date identification information.

17. A method for providing up-to-date base station identifiers for a terminal in a CDMA network, comprising:
selecting a base station in an active set of the terminal;
if the selected base station is dropped from the active set of the terminal,
terminating an existing data call while maintaining an existing data session,
processing an overhead channel to obtain up-to-date base station identifiers for the terminal, and
originating a new data call for the existing data session; and
providing the up-to-date base station identifiers via IS-801 messages on a traffic channel assigned for the new data call.

18. The method of claim 17, further comprising:
receiving an indication that the up-to-date bate station identifiers are needed; and
in response to the indication,
performing terminating the existing data call, processing the overhead channel, and originatine the new data call if the selected base station is dropped from the active set, and
performing providing the up-to-date base station identifiers via IS-801 messages on the traffic channel.

19. The method of claim 18, wherein the indication is received in response to a new position determination session.

20. The method of claim 17, further comprising:
if the selected base station is dropped from the active set of the terminal,
maintaining a Point-to-Point Protocol (PPP) connection for the existing data session after terminating the existing data call.

21. The method of claim 17, further comprising:
receiving aiding information used for position determination and provided by a network entity based on the up-to-date base station identifiers.

22. An apparatus comprising:
means for receiving an indication that identification information for a terminal is needed;
means for determining whether or not identification information currently available for the terminal, if any, is up-to-date;
means for obtaining up-to-date identification information for the terminal from an overhead channel if the currently available identification information is not up-to-date, comprising
means for terminating an existing data call,
means for processing the overhead channel to obtain the up-to-date identification information, and
means for originating a new data call; and
means for providing the up-to-date identification information in IS-801 messages sent on a traffic channel over a wireless communication link.

23. The apparatus of claim 22, wherein the means for obtaining up-to-date identification information for the terminal from an overhead channel if the currently available identification information is not up-to-date further comprises
means for maintaining an existing data session after terminating the existing data call, and
means for using the new data call forte existing data session.

* * * * *